March 10, 1964 W. HOLZER 3,124,667

CONTROL APPARATUS FOR AUTOMATIC WASHING MACHINES

Filed May 19, 1960

INVENTOR:
WALTER HOLZER

By Toulmin & Toulmin

Attorneys 3,124,667

CONTROL APPARATUS FOR AUTOMATIC WASHING MACHINES

Walter Holzer, Drosteweg 19, Meersburg (Bodensee), Germany

Filed May 19, 1960, Ser. No. 30,327
Claims priority, application Germany June 1, 1959
7 Claims. (Cl. 200—33)

The invention concerns an apparatus for the control of fully automatic washing machines with a control disc mounted in the casing, whose concentric tracks have cam discs which are sensed by rigid sensing levers standing on edge.

It is known to install such control discs in a casing wherein, on one side of the control disc, the sensing levers sense the concentric cam tracks and, on the other side, the control disc is supported relative to a base surface connected with the casing. The disadvantage of this arrangement consists in the fact that the baseplate must be strong in order that it should not flex under the stress to which the control disc is subjected; furthermore, it must be very flat in order that the control disc should run accurately, and since the sensing pressure of the sensing lever bears on the control disc from one side on to the cam track and further, since a spring bears on this which presses the control disc on to the support, this arrangement is difficult to manufacture and/or expensive, and is incapable of being checked as regards its adjustment, since once it has been installed the control disc is no longer accessible without altering the adjustment.

An object of the invention is to avoid these disadvantages and to construct the apparatus in such a manner that it insures a cheaper production with more accurate operation and easier accessibility.

According to the present invention an apparatus for the control of fully automatic washing machines comprises a casing, said casing supporting a control disc having concentric tracks which have cams adapted to be sensed by rigid sensing levers standing on edge, characterized in that projections are arranged adjacent the sensing levers which are fixed in the casing on which the control disc is supported.

The projection should be arranged in the casing in the region of the outermost diameter of the control disc, a spring being adapted to press the center of the control disc against the casing and/or the projections. In this case it is expedient that the axis of rotation of the control disc is at the same time the centering axis for the spring.

A preferred form of construction is obtained by the feature that the projections form triangles disposed at right angles each with its apex towards the axis of rotation, and the sensing levers are arranged between the parallel sides of adjacent triangles. In this construction, projections, which simultanteously act as distance pieces, are provided for the abutment of the control disc so that the casing which is constructed integrally with the bores for the attachment of the sensing levers and the projections, and the control disc which is now pressed from the other side by a spring against these projections, can be easily mounted, cannot flex and, due to the mounting, the contacts are also accessible and now the casing forms a unitary whole with the contact disc, since a base surface is no longer necessary which as a further reference point prejudices the accuracy of the construction, or if the baseplate be made appropriately strong and accurate, increases the cost of the construction.

Since the spring only loads the center of the control disc it is possible, furthermore, for the rear face of the control discs to have sliding contacts which travel over a printed circuit or similar conducting contact segments.

A still better utilization of the contact disc is obtained if a contact casing carries on one side the sensing levers within the control disc, and on the other side the printed circuit, wherein the connections of the sensing levers of the sliding contacts and the printed contact tracks terminate in contact lugs which are fixed in the contact casing.

It is preferable in this case for a centering axle of the contact casing to connect the control disc and the printed circuit.

In order to be able to carry out as many programs as possible, it is important that the control disc and the printed circuit should be constructed so as to be exchangeable.

It is particularly advantageous that the sensing levers be disposed in the operating circuits of the washing machine for example, heating, washing motor, etc., while the sliding contacts should be disposed in the indicating or auxiliary circuits, such as control lamps, actuating relays, control circuits and so on.

Further combinations are possible by the feature that several contact casings with control discs, sensing levers and sliding contacts have a common centering axial and drive.

By means of this construction there is the particular advantage that only a single structural element has to be installed in the washing machine namely, a contact casing from which connection lugs project, which are intended for the connection to the operating circuits and indicating circuits. Then in one casing separate circuits are present which are synchronised to one another, that is, actuating and signal circuits for example, and since the control disc is produced by a pressing operation no further adjustment of any sort is necessary because there is always an accurate disposition of the individual contact tracks relative to one another.

The possibility that sensing levers by reason of their large stroke which the cams impart to them on the concentric cam tracks are in the position to switch large outputs enables the direct switching of actuating members, such as valves, washing machine motors and so on, while the contact tracks installed on the opposite face of the control disc which are formed as a printed circuit now switch the corresponding indicating or auxiliary circuits.

In the utilization of the control disc it is possible to go further, and indeed one embodiment is provided by the feature that a further auxiliary control disc is arranged so as to be rotatable within the control disc.

Within the so-called main control disc which switches the program, an auxiliary control disc may be disposed which is used for the switching of the washing machine motor. Due to the spatial arrangement of these two control discs, special advantages occur.

One possibility consists in the fact that the auxiliary control disc is disposed concentrically in the control disc with a separate drive.

A separate drive may be provided for the concentrically arranged auxiliary control disc in order that it should rotate more rapidly than the control disc proper. The auxiliary control disc which has only a relatively small diameter, since it is disposed concentrically within the main control disc, must run with greater peripheral speed in order that the control operations necessary for the washing motor can be carried out.

A further possibility consists in the fact that the auxiliary control disc is driven from an internal toothing of the control disc.

In this construction there is a dependency of the movements of the control disc and the auxiliary control disc. It is quite appropriate to carry out this dependency with special washing procedures, since in this case a similar course takes place in the running off of the control operations with the washing motor and with the washing program.

Further possibilities consist in the fact that several auxiliarly control discs are arranged in the control disc like planetary wheels, and all control discs have the same clearance planes. In this construction the large control disc which is driven from an external toothing can be used in such a way as to drive the auxiliary control discs disposed within it wherein internal toothing and power transmissions known in themselves are used. Obviously also frictional gearing could be used. It is essential that the sensing of all these control discs should be effected by means of sensing levers which are stressed on one side and arranged on edge adjacent to one another, and the whole control discs or the revolving cam tracks are arranged in one sensing plane. The whole arrangement can in this way be installed in one casing and it is only necessary to provide the drive for the control discs and the connections to the sensing levers outside the casing.

Another possibility consists in the feature that the cams switching the washing procedure are partially arranged on the control disc, while the turning contacts with auxiliary contacts and reversing contacts of the washing and centrifuging procedure are arranged on the auxiliary control disc.

In addition to the contacts which actuate the switching of the washing motor, switch cams can be installed on the first running control disc or in each case on a separate control disc, which for themselves alone reverse or switch over from the washing procedure to the centrifuging procedure, whereby one has the advantage that a dwell is compulsorily disposed between the reversal from washing to centrifugal procedure, and in this way any kind of loads on the washing motor which might occur with too rapid reversal in this step of the process can be eliminated.

The invention will be described further, by way of example, with reference to the accompanying drawings, in which.

Figure 1:
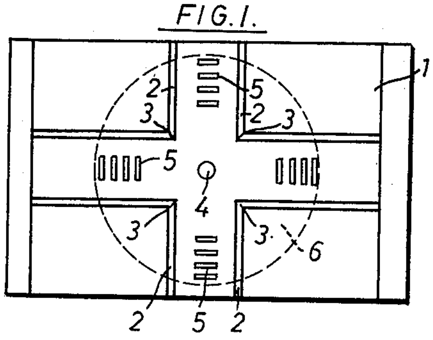
FIG. 1 is a front elevation of a casing of the apparatus with a control disc.

In FIG. 1 a casing 1 is shown in which projections 2 are arranged which are formed from right-angled triangles whose apexes 3 are presented towards a rotary axis 4 of a control disc 6. Sensing levers 5, which are arranged between the parallel faces of the projections, sense concentric tracks (not shown) of the control disc 6, and are moved up and down in the direction of the arrow 8 in each case as these concentric tracks are provided. A spring 7 presses the control disc 6 against the projections 2. It is evident that the essential functional spacing 9 between the casing 1 and the control disc 6 is definitely determined by the height of the projections 2 and, since the control discs are produced with the projections and the interruptions or apertures for the attachment of the sensing levers 5 by an injection process or by a pressing process in synthetic material, a simple and faultless production is guaranteed.

Figure 3:
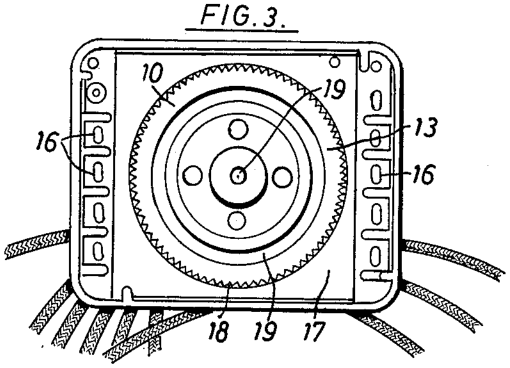
FIG. 3 is a view of the casing of the apparatus with the inserted control disc, but with the printed circuit diagram removed.

A control disc 10 is illustrated in FIG. 3. It has concentric tracks 11 which are sensed by sensing levers, which the sensing levers engage through apertures 12. In the illustrated embodiment there are sixteen sensing levers which sense on sixteen cam tracks disposed at intervals relative to one another. The rear face of the control disc 10 has slots 13 for sliding contacts wherein in the embodiment one slot is shown in which a sliding contact is then resiliently installed in known manner.

Figures 2, 4, 6:
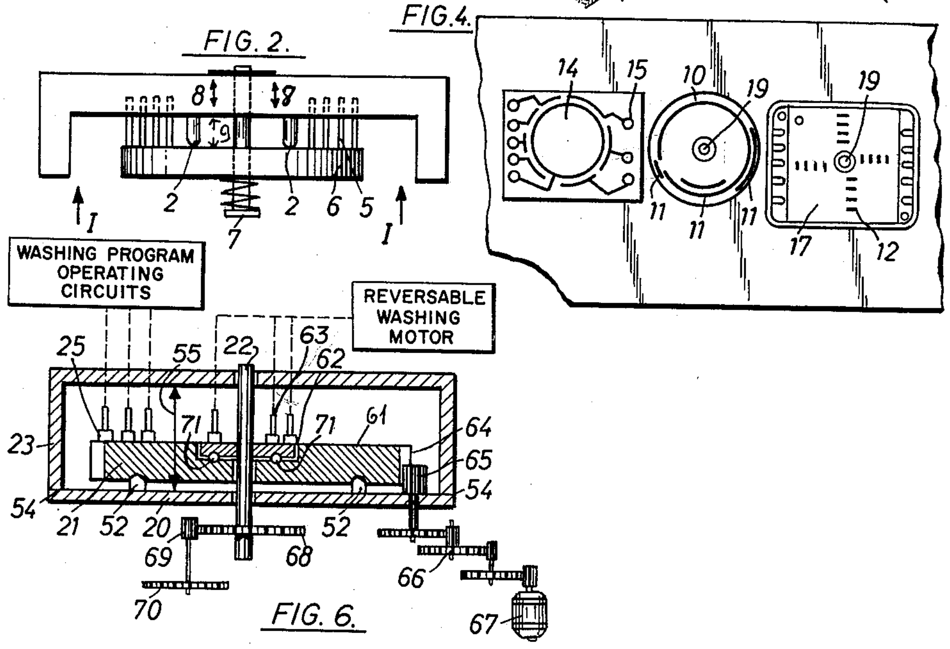
FIG. 2 is a corresponding plan.
FIG. 4 is a view of the individual parts as they are inserted into the casing, and in this case the control disc and the printed circuit are inserted after one another but swung around in each case through 180°.
FIG. 6 is a view of an apparatus in which a single auxiliary control disc is rotatably arranged within the control disc.

If the printed circuit 14 illustrated in FIG. 4 is used for closing off the contact casing 17 shown in FIG. 3, then the sliding contacts in the slots 13 sense the contact tracks of the printed circuit. The connections of these contact tracks 15 then terminate in contact lugs which are led through slots 16 of the contact casing 17 so that connections can be made to the actuating and auxiliary circuits in one common contact casing, which circuits, however, are electrically separated from one another. A centrally situated bore 19 then serves for the reception of a centering axle (not shown). The drive of the control disc takes place in a toothed crown 18.

Another baseplate 20 is present in FIG. 6 on which a control disc 21 is resiliently attached, wherein an axial shaft 22 is present which serves for centering, and a casing 23 encloses the whole assembly, wherein fitting edges 54 are present on to which the casing then presses. Between the baseplate 20 and the inner edge of the casing cover, a clearance 55 is then present. A sensing plane 61 is then sensed by sensing levers 25. Now in addition, there is also an auxiliary control disc 62 present which is sensed by sensing levers 63. The sensing levers 25 and 63 are situated in the same sensing plane, that is to say, an auxiliary control disc 62, in the embodiment, is concentric and let in with its sensing plane flush with the control disc 21. The control disc 21 is driven by means of an external toothing 64, a driving pinion 65 and a gear 66 from a driving motor 67. In the embodiment a separate drive for the auxiliary control disc 62 is present, wherein the axle 22 is constructed as a rotary shaft on which the auxiliary control disc 62 and the driving toothed wheel 68 are attached. A pinion 69 then drives this auxiliary control disc forward by way of a gear 70 and a drive motor (not shown), wherein this auxiliary control disc for its part again runs on ball bearings 71 which are guided in cages as the balls of the control disc and make possible easy rotation of the auxiliary control disc. The balls then maintain the clearance between the auxiliary control disc 62 and the control disc 21 and make possible the relative movement of these two control discs with reference to one another. The sensing levers 63 sense cam tracks which serve for the switching of the reversing contacts of the reversible washing motor. The auxiliary disc may control the switching of the auxiliary contacts, or be used in any other way for the switching of other contacts which depend indirectly or directly upon the washing procedure or on the switching procedure which the control disc 21 carries out.

A particularly advantageous embodiment is provided if the cams arranged on main control disc 21 switches operating circuits of the washing machine for carrying out the washing program and the contacts controlling the reversal of the washing motor are arranged on the auxiliary control disc 62.

The reversing contacts for the washing machine motor must switch at very much shorter time intervals than the cams which switch the washing program. It is therefore expedient that the last-named cams be arranged on the large diameter of the main control disc 21 rotating stepwise and slowly, while the cams which effect the reversal of the direction of rotation, and if necessary the switching of the washing and steady running procedure, by means of auxiliary contacts are sensed on inwardly disposed rapidly running control cams or auxiliary disc 62.

Figure 5:
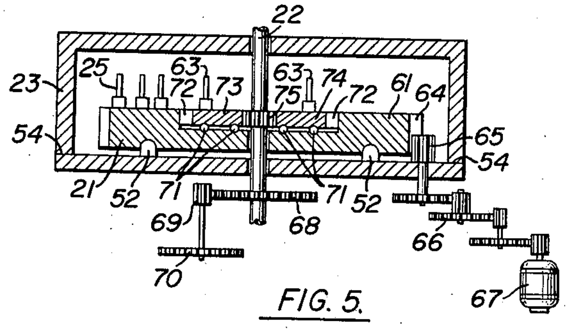
FIG. 5 is a view of an apparatus having several auxiliary control discs rotatably arranged within a main control disc.

In FIG. 5 it is shown how several auxiliary control discs such as 73 and 74 are arranged in control disc 21 like planetary wheels, and all control discs have the same clearance plane. The large control disc 21 is being driven through its external toothing 64 as aforedescribed. The auxiliary control discs 73 and 74 can be driven through an internal toothing 72 in the recess of control disc 21, and auxiliary control discs 73 and 74 can alternatively be driven through the aforedescribed power transmission of axle 22 now preferably having a gear 75.

I claim:

1. An apparatus for the control of automatic washing machines comprising: a casing; a main control disc in said casing having a plurality of concentric cam tracks and having an annular recess; an auxiliary control disc having cam tracks and being rotatably supported in said recess; a first and second set of contacts respectively scanning the tracks of said discs in axial direction; and means for driving said discs.

2. An apparatus for the control of fully automatic washing machines comprising: a casing; a first, main control disc rotatably supported in said casing and having a plurality of concentric cam tracks, further having an annular and concentric recess, a second, auxiliary control disc with concentric cam tracks, and being rotatably supported in said recess; a first and second set of contacts respectively scanning the tracks of said disc in axial direction; and first and second driving means for independently driving said discs.

3. An apparatus for the control of fully automatic washing machines comprising: a casing; a main control disc rotatably supported in said casing and having a plurality of concentric cam tracks, further having an annular and concentric recess, a auxiliary control disc with concentric cam tracks; a shaft penetrating said main control disc and supporting said auxiliary control disc; a first and second set of contacts respectively scanning the tracks of said discs in axial direction; rotatable means geared to said main disc and permitting the transfer of rotation from outside of said casing upon said main disc; and further rotatable means geared to said shaft permitting the transfer of rotation from the outside of said casing upon said auxiliary disc.

4. An apparatus as claimed in claim 1, characterized in that said auxiliary control disc is mounted on a shaft protruding through said main control disc.

5. An apparatus as claimed in claim 1, characterized in that said auxiliary control disc is driven from an internal toothing of the main control disc.

6. An apparatus as claimed in claim 1, characterized in that several auxiliary control discs are arranged in the main control disc like planetary wheels and all control discs have the same sensing plane.

7. The apparatus of claim 1 in which the main control disc with its first set of contacts controls the washing program, while the auxiliary control disc with its second set of contacts controls the reversal from washing to centrifuging.

References Cited in the file of this patent

UNITED STATES PATENTS

| | | |
|---|---|---|
| 2,130,290 | Polta et al. | Sept. 13, 1938 |
| 2,666,821 | Cannon et al. | Jan. 19, 1954 |